United States Patent
Besser et al.

(10) Patent No.: US 6,358,466 B1
(45) Date of Patent: Mar. 19, 2002

(54) THERMAL SPRAYED COMPOSITE MELT CONTAINMENT TUBULAR COMPONENT AND METHOD OF MAKING SAME

(75) Inventors: Matthew F. Besser, Urbandale; Robert L. Terpstra, Ames; Daniel J. Sordelet, Ames; Iver E. Anderson, Ames, all of IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/343,019

(22) Filed: Apr. 17, 2000

(51) Int. Cl.[7] .................................................. C21C 7/00
(52) U.S. Cl. ........................ 266/234; 266/237; 266/280; 222/593
(58) Field of Search .............................. 222/590, 591, 222/593; 266/234, 239, 237, 280

(56) References Cited

U.S. PATENT DOCUMENTS 5,052,597 A  * 10/1991  Bruckner ................... 222/593
5,125,574 A  *  6/1992  Anderson et al. ............... 239/8
5,939,016 A  *  8/1999  Mathiesen et al. .......... 222/593

OTHER PUBLICATIONS

Ronald W. Smith and Richard Knight, "Thermal Spraying II: Recent Advances in Thermal Spray Forming," JOM (Apr. 19, 1996) pp. 16–18.

* cited by examiner

Primary Examiner—Scott Kastler

(57) ABSTRACT

A tubular thermal sprayed melt containment component for transient containment of molten metal or alloy wherein the tubular member includes a thermal sprayed inner melt-contacting layer for contacting molten metal or alloy to be processed, a thermal sprayed heat-generating layer deposited on the inner layer, and an optional thermal sprayed outer thermal insulating layer. The thermal sprayed heat-generating layer is inductively heated as a susceptor of an induction field or electrical resistively heated by passing electrical current therethrough. The tubular thermal sprayed melt containment component can comprise an elongated melt pour tube of a gas atomization apparatus where the melt pour tube supplies molten material from a crucible to an underlying melt atomization nozzle.

22 Claims, 3 Drawing Sheets

THERMAL SPRAYED COMPOSITE MELT CONTAINMENT TUBULAR COMPONENT AND METHOD OF MAKING SAME

CONTRACTUAL ORIGIN OF INVENTION

The United States Government has rights in this invention pursuant to Contract No. W-7405-ENG-82 between the U.S. Department of Energy and Iowa State University, Ames, Iowa, which contract grants to Iowa State University Research Foundation, Inc. the right to apply for this patent.

FIELD OF THE INVENTION

The present invention relates to tubular containment components for transient containment of molten materials, such as for example only metals and alloys.

BACKGROUND OF THE INVENTION

Melt processing of reactive, high temperature metals and alloys has created a need for advanced refractory components to contain the molten material during melt processing. Processes such as gas atomization require melt containment components, such as crucibles and pour tubes, that resist attack from molten metals and alloys, which may be superheated. Some molten alloys, such as titanium based alloys, are extremely aggressive towards conventional melt containment materials such as graphite, zirconia and alumina.

Moreover, melt processing applications require the melt containment component to remain free of obstructions from prematurely solidified metal or alloy in order to maintain flow of the melt during processing and to maintain the temperature of the molten material within a selected range. For example, as described in Anderson et al. U.S. Pat. No. 5,125,574, a refractory melt pour tube of a crucible supplies molten metal or alloy to an atomization nozzle and must remain free of obstruction during the atomizing process. The melt pour tube is described as surrounded by a thermally insulating air space to avoid premature freeze-up of the pour tube. The insulating space may have a heat reflector or electrical heating element disposed therein. Moreover, in such gas atomization apparatus, the temperature of the melt at the atomizing nozzle should be controlled to optimize the atomizing process from the standpoint of producing the desired sizes of atomized particles. Cooling of the melt as it flows through the pour tube should be reduced or minimized to this end.

An object of the present invention is to provide an improved tubular refractory melt containment component and method of making same for use in the melt processing of melted materials, such as for example only reactive liquid materials.

SUMMARY OF THE INVENTION

The present invention provides a tubular thermal sprayed melt containment component or member for transient containment of molten material wherein the tubular containment member includes a thermal sprayed inner melt-contacting layer for contacting molten metal or alloy to be processed, a thermal sprayed heat-generating material deposited on the inner melt-contacting layer, and an optional thermal sprayed outer thermal insulating layer. In use, the thermal sprayed heat-generating layer is inductively heated as a susceptor of an induction (electromagnetic) field or resistively heated by passing electrical current therethrough. The heat-generating material can comprise the traditional refractory metals such as W, Ta, Mo and alloys thereof one with another and/or with other metals, Ni—Cr alloys, iron as well as other metals or alloys or ceramics that can withstand the temperature of the particular melt being processed.

In an illustrative embodiment of the present invention, the thermal sprayed tubular melt containment component pursuant to the present invention comprises an elongated melt supply or pour tube of an atomization apparatus where the melt pour tube supplies molten material from a crucible to an underlying melt atomization nozzle. A refractory metal layer of the pour tube is inductively heated by an induction coil or is resistively heated by connection to an electrical power source during melt atomization.

A thermal sprayed melt containment component or member pursuant to the present invention is made by thermally spraying melt-compatible material on a fugitive mandrel to deposit the inner melt-contacting layer, selectively removing the mandrel, and thermally spraying the heat-generating material on the exterior surface of the inner layer. If used, the outer thermal insulating layer is thermally sprayed on the heat-generating layer.

DETAILED DESCRIPTION OF THE INVENTION

Figure 2:
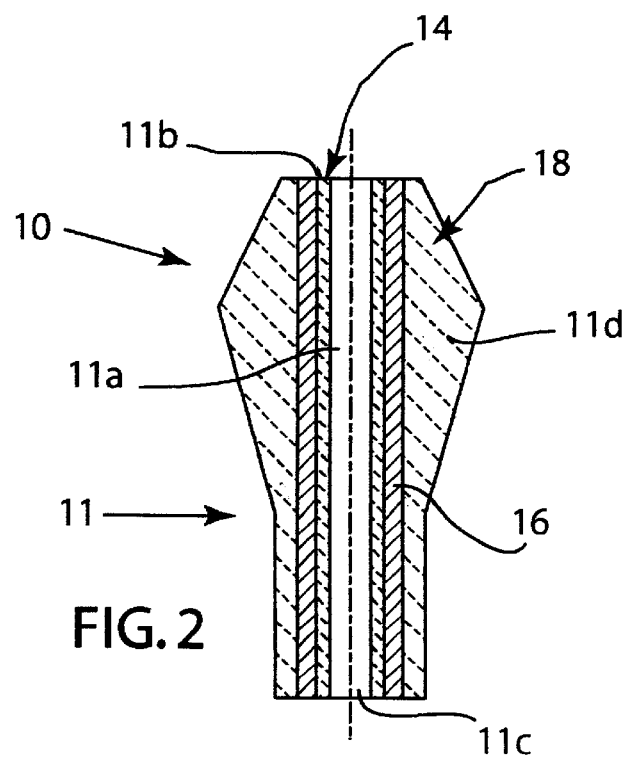
FIG. 2 is a cross-sectional view of the inner melt-contacting layer after removal of the mandrel and after a heat-generating layer and optional outer thermal insulating layer are thermally sprayed thereon.

The present invention provides a thermal sprayed tubular melt containment component or member 10 shown for purposes of illustration and not limitation in FIG. 2 as a cylindrical (or other cross-sectional shape) melt supply or pour tube 11 for use in gas atomization apparatus of the type described in U.S. Pat. No. 5,125,574, the teaching of which are incorporated herein by reference. The tubular melt pour tube 11 supplies molten material, such as molten metal or alloy, from a crucible 20 to an underlying melt atomization nozzle 30 having a plurality of high pressure gas discharge orifices 30a, FIG. 4, when a stopper rod 22 is raised from the crucible bottom opening 20a. Orifices 30a receive pressurized atomizing gas from manifold 31 as described in U.S. Pat. No. 5,125,574. The melt pour tube 11 comprises a tubular configuration for transient containment of the melt flow between the crucible 20 and the nozzle 30. To this end, the pour tube 11 includes a melt flow passage 11a and open end 11b communicating to the crucible 20 to receive melt therefrom as controlled by the stopper rod 22 and an open melt discharge end 11c to discharge the melt at the nozzle 30 for atomization by high pressure argon or other gas discharged from nozzle discharge apertures 30a as described, for example, in U.S. Pat. Nos. 5,125,574 and 5,228,620, the teachings of which are incorporated herein by reference to this end. The pour tube discharge end 11b can be surrounded by a tubular stainless steel tip 33 as described in the patent.

In accordance with an illustrative embodiment of the invention, the pour tube 11 includes a thermal sprayed inner tubular melt-contacting layer 14 for contacting the melt flowing from the crucible 20 to the nozzle 30, a thermal sprayed tubular heat-generating layer 16 deposited on the inner layer 14, and an optional thermal sprayed outer tubular thermal insulation layer 18 deposited on the layer 16. Alternately, in lieu of thermal sprayed outer layer 18, a refractory support or body (not shown) can be used and configured to receive the pour tube 11 formed by thermal sprayed layers 14, 16.

The melt-contacting material of the inner layer 14 can comprise any suitable material that can withstand the temperature of the melt flowing through the pour tube 11 and that is compatible (e.g. not substantially reactive) with the melt flowing through the pour tube 11, is not substantially attacked or deteriorated by the melt, and will not contaminate the melt. For example, the inner melt-contacting layer 14 can comprise a refractory noble metal such as for example only Pt, Pd, etc., a ceramic material, a polymer material (e.g. Teflon polymer) in melt processing of non-metal melts, and other suitable materials. For purposes of illustration only, a ceramic such as yttria stabilized zirconia can be used for contact with Cu—Cr alloy melts that include up to 90 volume % Cr. Yttrium oxide is a suitable ceramic when titanium and its alloys (e.g. $TiAl_3$, $Ti_3Al$, Ti-6 weight % Al-4 weight % V and others) are melted in the crucible 20 and atomized by nozzle 30. Other ceramic materials suitable for molten titanium and its alloys include, but are not limited to, $Er_2O_3$, $Dy_2O_3$, $HfO_2$, CaO and others. Other ceramic materials that can used in lieu of ceramic oxides include, but are not limited to, ceramic carbides, nitrides, borides and others (e.g. only TiC, HfC, $ZrB_2$, etc.).

The heat-generating layer 16 can comprise the traditional refractory metals such as W, Ta, Mo and alloys thereof one with another and/or with other metals as well as other metals (e.g. iron) or alloys or refractory materials (yttria-stabilized zirconia) that can withstand the temperature of the particular melt being processed and can be induction heated by suscepting to an electromagnetic field. Resistance heating materials that can be used in practice of the invention include Ni—Cr and other materials to this end.

The optional outer thermal insulating layer 18 typically comprises a ceramic material to provide outer thermal insulation and strengthening about the inner layer 14 and heat-generating layer 16 if desired. If the inner layer 14 comprises ceramic, the thermal insulating layer 18 may comprise the same or different ceramic material as layer 14.

Figure 4:
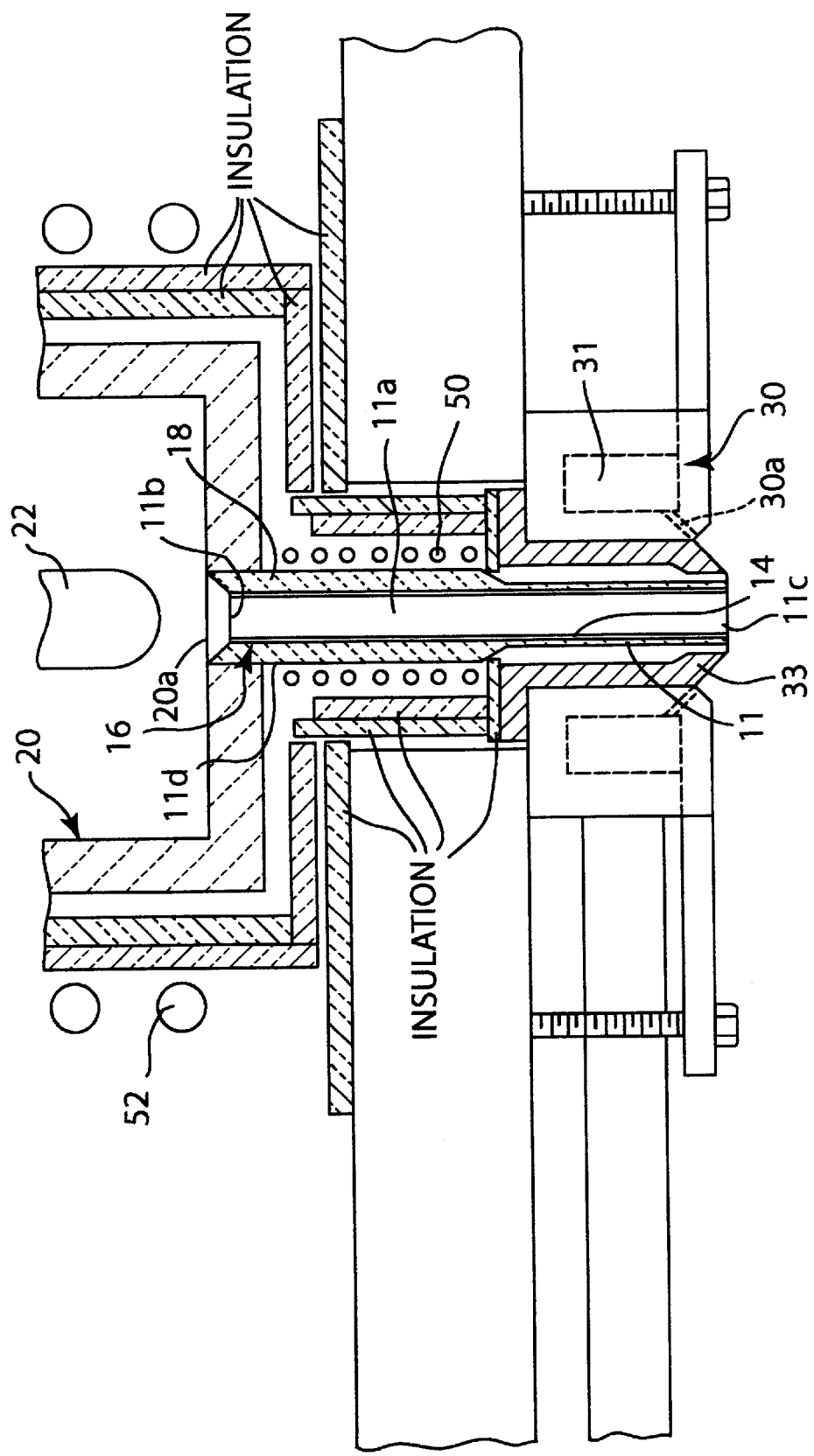
FIG. 4 is a sectional view of high pressure gas atomizing apparatus showing a melt pour tube positioned between a melting crucible and gas atomizing nozzle.

In use in the atomization apparatus of FIG. 4, the thermal sprayed tubular layer 16 is inductively heated as a susceptor of a radio frequency or other suitable heating frequency induction (electromagnetic) field of induction coil 50 or, alternately, resistively heated by passing electrical current therethrough by connecting the tubular layer 16 to a conventional electrical power source 51, such as a conventional DC furnace power supply. The induction coil 50 can comprise a separate induction coil 50 disposed about part of or the entire length of pour tube 11 to inductively heat the length of the tubular layer 16 with another induction coil 52 disposed about the crucible 20 to melt the charge therein. Alternately, the induction coil 50 may comprise an integral portion of the main induction coil 52 that is used to melt a charge in the crucible 20, the pour tube 11 and surrounding components in FIG. 4 being modified to this end. The main induction coil 52 would be arranged to inductively heat both a solid charge (e.g. solid metal or alloy charge) in the crucible 20 and the tubular heat-generating layer 16. Heating of the tubular layer 16 reduces or minimizes cooling of the melt as it flows from the crucible 20 through the pour tube 11 to provide improved temperature control of the melt when it is discharged from pour tube end 11c at the nozzle 30 to better control atomized particle size. Heating of the pour tube 11 also prevents premature freeze up of the melt in the passage 11a of the pour tube 11.

Figure 1:
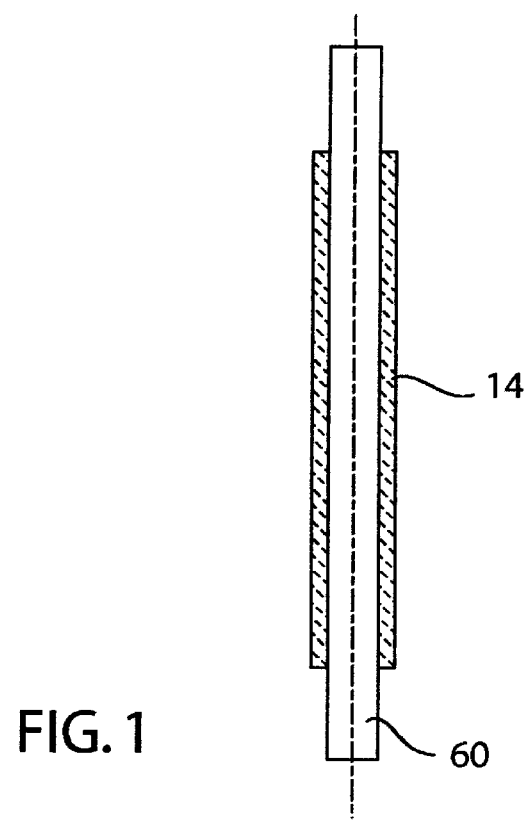
FIG. 1 is a cross-sectional view of a fugitive mandrel having an inner melt-contacting layer thermally sprayed thereon.

The thermal sprayed melt containment pour tube 11 illustrated and described is made by thermally spraying suitable material on a fugitive mandrel 60, FIG. 1, to deposit the inner tubular melt-contacting layer 14 thereon. The fugitive mandrel 60 is machined or otherwise formed to have a configuration corresponding in negative image to the melt flow passage 11a to be formed in the pour tube 11. As a result, simple and complex melt flow passages can be formed in the pour tube 11 as needed in a particular melt processing application. Moreover, the exterior configuration of the pour tube can be controlled by varying the thickness of the ceramic layer 14 as desired along the length of the mandrel by appropriately manipulating the thermal spraying device (e.g. a plasma arc spray gun). For example, the radially, frustoconical enlarged pour tube section 11d in FIG. 2 can be formed in this manner to support the pour tube 11 on thermal insulation layer 18. The pour tubes 11 in FIGS. 2 and 4 are shown with slightly different illustrative external configurations that can be used in practicing the invention, but the invention is not so limited as other pour tube external and internal configurations can be used.

The fugitive mandrel 60 then is selectively removed from the thermal sprayed tubular inner melt-contacting layer 14. For example, if the mandrel 60 is machined of graphite the mandrel 60 with the tubular layer 14 thereon can be removed by heating the mandrel 60/layer 14 at 1000 degrees C. in air for 24 hours to burn out the mandrel 60. Alternately, the mandrel 60 can be selectively removed by chemical dissolution or attack, melting, vaporization, and other removal techniques depending upon the mandrel material used. Other mandrel materials that can be used include, but are not limited to, wood, copper, thermoplastics, salt and others. The mandrel 60 can be formed to desired configuration by machining, molding, casting, and other suitable forming method for the particular mandrel material used.

Thermal spraying of the inner melt-contacting layer 14 can be accomplished using various thermal spraying techniques which direct a spray of molten or semi-molten or softened droplets of material at the mandrel and include, but are not limited to, conventional plasma arc spray (PAS) that involves electrically ionized carrier gas and ceramic powder feed material, high velocity oxygen fuel torch (HVOF) that involves a combustion of hydrogen or hydrocarbon fuel and oxygen and ceramic powder feed material, wire arc spray (WAS) that involves electric melting of wire or rod feed material, and other thermal spray techniques where finely divided ceramic, metal or other material of inner layer 14 is deposited on the mandrel 60 in a molten or semi-molten or softened condition to form a spray deposit or layer. The mandrel 60 typically is not preheated prior to commencement of the thermal spraying operation. The mandrel 60 typically is heated during formation of the inner layer 14 by the thermal spraying of molten or semi-molten ceramic material which solidifies or cools thereon, although the mandrel 60 can be preheated using the thermal spray equipment, resistance heating, or an external heat source such as a heat gun if desired to provide an elevated mandrel temperature prior to thermal spraying. Alternately, the temperature of the mandrel 60 and sprayed layers 14,16,18 can be independently controlled to optimize thermal stresses and thereby eliminate part cracking.

The layers 16 and 18 can be thermally sprayed in the manner described above. The heat-generating layer 16 is thermally sprayed onto the typically self-supporting inner tubular melt-contacting layer 14, FIG. 1, after removal of the fugitive mandrel 60, if the layer 16 comprises a refractory metal such as W, Ta, or Mo or alloys thereof. The refractory metal is selected to be compatible with the adjacent ceramic layer 14 and 18, if present. The outer layer 18 optionally then is thermally sprayed onto the exterior surface of heat-generating layer 16 in the manner described above for inner layer 14.

The as-deposited thickness of the inner melt-contacting layer 14 typically is in the range of about 0.4 to about 1.5 millimeters. The length of the as-deposited heat-generating layer 16 typically corresponds to the length of the inner layer 14 so that the entire thermally sprayed pour tube can be heated along its entire length in use, although the length of the layer 16 can be less than the length of inner layer 14 if desired. The as-deposited thickness of the heat-generating layer 16 typically is in the range of about 0.5 to about 1.5 millimeters. The as deposited thickness of the optional outer thermal insulating layer 18 typically is in the range of about 1 to 10 millimeters as desired to impart thermal insulation and strength to the pour tube. The porosity of the thermally sprayed pour tube 11 is in the range of about 1 to 15 volume %.

After the pour tube 11 is thermally sprayed in the above manner, it may be machined to length and provide pour tube ends 11b and 11c defining the melt inlet and outlet of the pour tube 11 as well as other features on the pour tube 11 that may be required to mate or cooperate with the crucible 20 or nozzle 30. The thermally sprayed pour tube 11 can be machined by conventional machining practice used for brittle materials, such as for example, diamond grinding and sawing.

The machined pour tube 11 then is assembled in the bottom of the crucible 20 by tight fit and sealed with appropriate ceramic paint and cooperatively positioned relative to nozzle 30 in the atomization apparatus of FIG. 3 for use in atomizing a metal, alloy or other material that is melted in the crucible 20.

The following Example is offered to further illustrate the invention but not limit the scope thereof.

EXAMPLE

A melt supply or pour tube for connecting a crucible and atomizing nozzle of a gas atomizing apparatus was made to include an inner yttria-stabilized zirconia layer 14 and tungsten layer 16 as follows:

Yttria-stabilized zirconia powder of greater than 10 micron diameter and less than 45 micron diameter was used and available from Praxair Surface Technologies, 1555 Main St., Indianapolis, Ind. 46224. Tungsten powder of greater than 45 micron diameter and less than 75 micron diameter were used and also available from Praxair Surface Technologies.

The fugitive mandrel 60 was constructed by machining a solid graphite cylinder into a negative of the desired pour tube passage 11a. The mandrel was drilled along the center axis to provide a 1.5 millimeters diameter hole therethrough to facilitate subsequent removal by burnout of the mandrel.

Figure 3A:
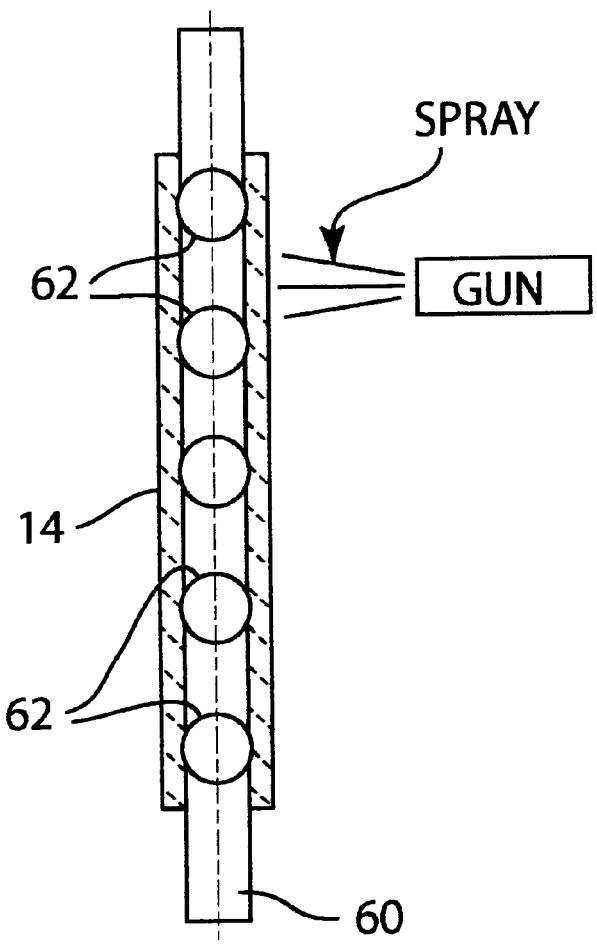
FIG. 3a is a schematic side view showing the plasma arc spray gun and cooling air jets for thermal spraying.
Figure 3B:
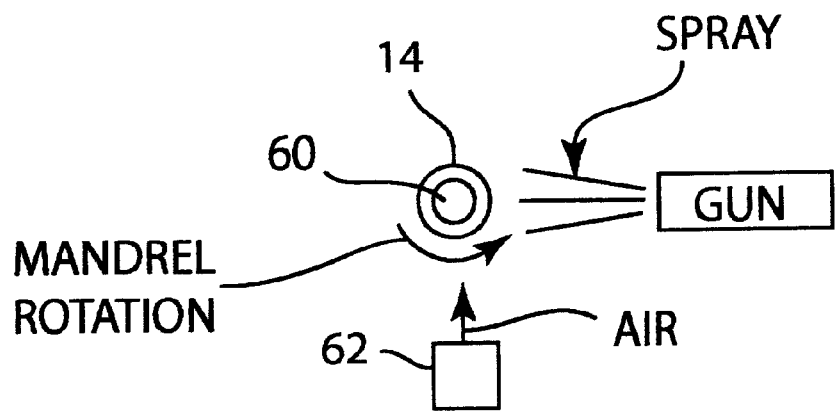
FIG. 3b is schematic plan view thereof.

During deposition of the inner layer 14, the mandrel was held in a rotating chuck (not shown) of an electric motor driven turntable in a vertical orientation and rotated at 300–400 rpm in the direction shown in FIG. 3b relative to the plasma arc gun GUN. Thermal spraying of the yttria stabilized zirconia powder was conducted using a commercially available Praxair SG-100 plasma arc gun available from Praxair Surface Technologies and operated under the following configuration and parameters:
anode—Praxair part number 3083-145
cathode—Praxair part number 3083-129
gas injector—Praxair part number 3083-130
electrical current—900 amperes
voltage at high frequency starter—43.6 Volts
Ar arc gas flow rate—37.8 slpm (standard liters/minute)
He auxiliary gas flow rate—20 slpm
Ar powder carrier gas flow rate—5.6 slpm
powder feed rate—15 grams/minute
spray distance (between gun and mandrel)—10 centimeters
gun cooling air wand (Praxair part number 5004566) and cooling jets 62 total flow rate—1500 slpm Thermal spraying of the tungsten (W) powder was conducted using the same plasma arc gun in FIGS. 3a, 3b, operated under the same gun configuration and parameters with the exception of increased W powder feed rate of 55 grams/minute.

The graphite mandrel was thermally sprayed with vertical strokes of the spray gun until a inner tubular yttria-stabilized zirconia layer 14 was deposited to a thickness of 0.8 to 1.2 millimeters and a length of 5 inches on the mandrel (6 inch mandrel length).

The mandrel with the thermally sprayed yttria-stabilized zirconia layer was removed from the chuck and placed on a bed of yttria-stabilized zirconia powder and heated to 1000 degrees C. in air for 24 hours to burn out the graphite mandrel.

The resulting clean yttria-stabilized zirconia tube then was mounted on the chuck and plasma arc sprayed in the manner described above with tungsten to form a tubular tungsten layer 16 on the inner yttria-stabilized zirconia layer or tube 14. Thermal spraying of the tungsten was conducted until a tungsten layer of 0.8 to 1.2 millimeters thickness was built up. The composite pour tube, FIG. 2, then was cut to length (3.5 inches final pour tube length) using a diamond saw.

During thermal spraying of the layers 14 and 16, cooling air jets 62 spaced apart along the length of the mandrel, FIG. 3a and 3b, discharged cooling air perpendicular to the axis of its rotation of the mandrel to impact the deposited material after it splats on the mandrel or previously deposited material and deforms without interfering with molten or semi-molten particles before they strike the mandrel or previous deposit. Five such cooling air jets 62 were equally spaced apart along the length of the sprayed layer 14 (or 16) at a standoff distance (e.g. about 1.5 inches) from the mandrel to establish overlapping cooling air jets on the sprayed layer 14 (or 16) to this end. The cooling jets 62 and the cooling wand of the plasma arc gun had a combined flow rate (total of all cooling jets 62 plus the cooling wand) of 1500 slpm using filtered shop air. The cooling air jets were directed 90 degrees ahead of the plasma arc spray gun as shown best in FIG. 3b. Suitable cooling air jets are available as Silvent nozzles from Silvent, 2920 Wolff Street, Racine, Wis. 53404 and can be spaced away from the mandrel within a typical range of 1 to 3 inches for example only depending upon particular spraying materials and parameters employed. Such high cooling gas flow rates rapidly cool the molten or semi-molten splats of deposited material (ceramic or tungsten) to retain residual compressive stresses especially in the inner tubular layer 14 but also layer 16 and layer 18, if used, to mitigate any thermal shock. The thermal sprayed tubular layers 14 and 16 and layer 18, if used, are built up through a sequence of droplet solidification events which form a lamellar microstructure comprising high aspect ratio grains (flattened solidified droplets) of the deposited ceramic or metal material. This layer microstructure produces a grain bridging effect and a network of isolated fine porosity to help resist the propagation of cracks caused by thermal stress.

A yttria-stabilized zirconia pour tube made in the manner described was tested by heating under argon in an induction furnace. The pour tube was heated to 1800 degrees C. and back down to under 600 degrees C. at approximately 500 degrees/minute for 10 cycles with no evidence of thermal stress cracking or delamination of ceramic and tungsten layers. The tungsten layer 16 was compatible in direct contact with the tubular yttria-stabilized zirconia layer 14.

An optional outer yttria-stabilized zirconia layer 18 can be deposited on the tungsten layer 16 by thermal spraying using the plasma arc spray gun and configuration/parameters described above for depositing the inner melt-contacting layer 14.

Although the present invention has been described in terms of specific embodiments thereof, it is not intended to be limited thereto but rather only as set forth in the appended claims.

We claim:

1. The combination of a tubular melt containment member for containment of molten material and including an inner thermal sprayed melt-contacting layer, a thermal sprayed heat-generating layer deposited on said inner layer, a thermally sprayed outer thermal insulating layer deposited on said heat-generating layer, and means for causing said heat-generating layer to generate heat.

2. The combination of claim 1 wherein said outer thermal insulating layer comprises a ceramic material.

3. The combination of claim 1 wherein said heat-generating layer consists essentially of a refractory metal or alloy thererof.

4. The combination of claim 3 wherein said refractory metal or alloy is selected from the group consisting of W, Ta, and Mo and their alloys.

5. The combination of claim 1 wherein said means comprises an induction coil that inductively heats said tubular heat-generating layer.

6. The combination of claim 1 wherein said means comprises an electrical power source connected to said heat-generating layer consisting essentially of a metal or alloy in a manner to pass electrical current therethrough to provide electrical resistance heating thereof.

7. A tubular melt containment member for containment of molten material including an inner thermal sprayed melt-contacting layer for contacting molten material to be processed, a thermal sprayed heat-generating layer deposited on said inner layer, and a thermally sprayed outer thermal insulating layer deposited on said heat-generating layer.

8. The member of claim 7 wherein said outer thermal insulating layer comprises a ceramic material.

9. The member of claim 7 wherein said heat-generating layer consists essentially of a refractory metal or alloy thereof.

10. The member of claim 9 wherein said refractory metal or alloy is selected from the group consisting of W, Ta, and Mo and their alloys.

11. The member of claim 9 wherein said heat-generating layer consists essentially of a resistance heating metal alloy.

12. The member of claim 9 wherein said heat-generating layer comprises alloys of Ni and Cr.

13. Gas atomization apparatus comprising a crucible for containing molten material to be atomized, an atomizing nozzle and a melt supply tube between said crucible and said nozzle, said supply tube comprising a thermal sprayed inner melt-contacting layer for contacting molten material to be processed and a thermal sprayed heat-generating layer deposited on said inner layer, and means for heating said heat-generating layer by induction or electrical resistance.

14. The apparatus of claim 13 further comprising a thermal sprayed outer thermal insulating layer on said heat-generating layer.

15. The apparatus of claim 13 wherein said heat-generating layer consists essentially of a refractory metal or alloy thereof.

16. The apparatus of claim 15 wherein said refractory metal or alloy is selected from the group consisting of W, Ta, and Mo and their alloys.

17. The apparatus of claim 13 wherein said means comprises an induction coil that inductively heats said heat-generating layer.

18. The apparatus of claim 13 wherein said means comprises an electrical power source connected to said heat-generating layer consisting essentially of a metal or alloy in a manner to pass electrical current therethrough to provide electrical resistance heating thereof.

19. Method containing a molten material, comprising contacting said molten material with a tubular containment member having an inner thermal sprayed melt-contacting layer for contacting said molten material and a thermal sprayed heat-generating layer deposited on the inner layer, and generating heat from said heat-generating layer.

20. The method of claim 19 wherein said heat-generating layer is subjected to an electromagnetic field.

21. The method of claim 19 wherein an electrical current is passed through said heat-generating layer consisting essentially of a metal or alloy to provide electrical resistance heating thereof.

22. The method fo claim 19 including generating heat from said thermally sprayed heat-generating layer consisting essentially of a refractory metal.

* * * * *

UNITED STATES PATENT AND TRADEMARK OFFICE
CERTIFICATE OF CORRECTION

PATENT NO. : 6,358,466 B1
DATED : March 19, 2002
INVENTOR(S) : Matthew F. Besser et al.

It is certified that error appears in the above-identified patent and that said Letters Patent is hereby corrected as shown below:

Column 8,
Line 9, after "metal" insert -- or --.
Line 49, change "fo" to -- of --.

Signed and Sealed this

Third Day of September, 2002

Attest:

Attesting Officer

JAMES E. ROGAN
Director of the United States Patent and Trademark Office